May 16, 1939. W. D. SYKES 2,158,386
ROTARY VALVE FOR INTERNAL COMBUSTION ENGINES
Filed May 9, 1938 3 Sheets-Sheet 1

INVENTOR
W D SYKES
PER George Hughes
ATTORNEY

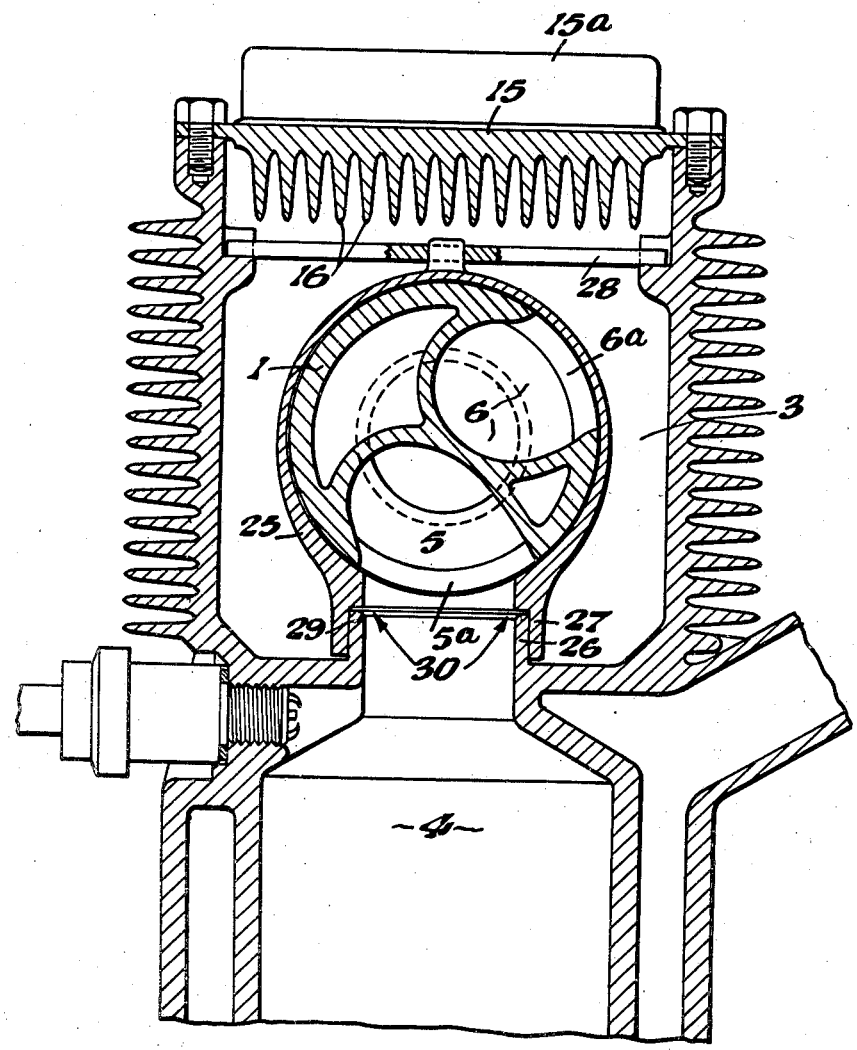

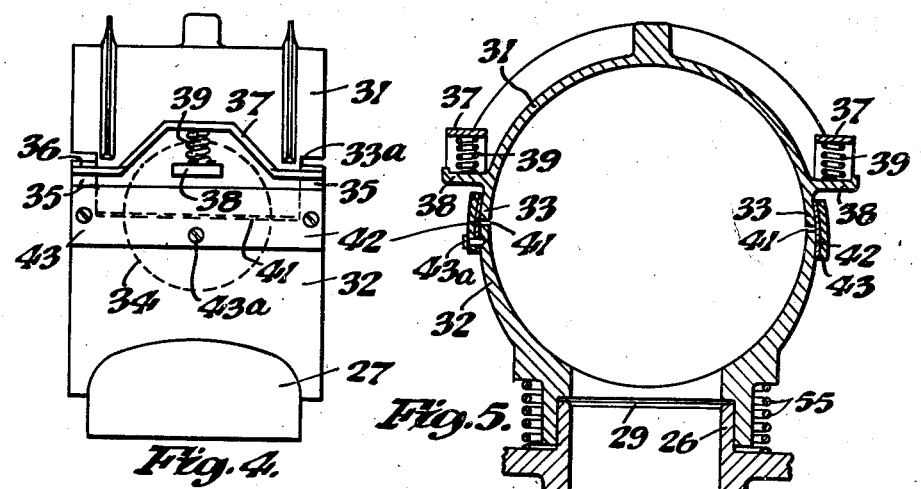
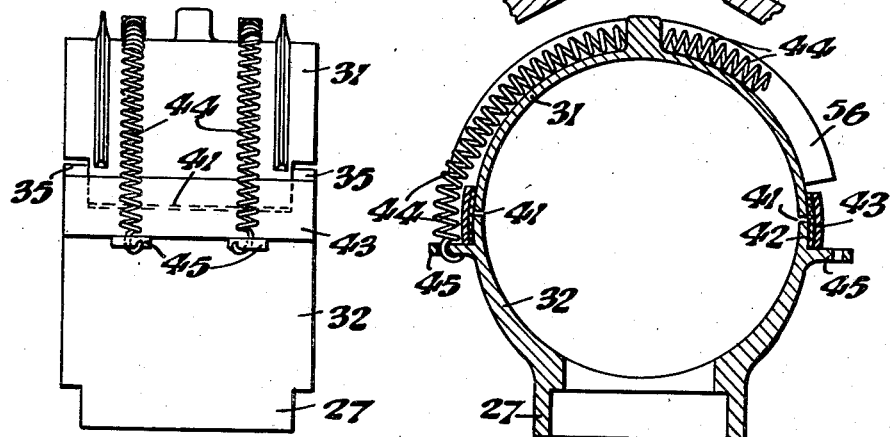
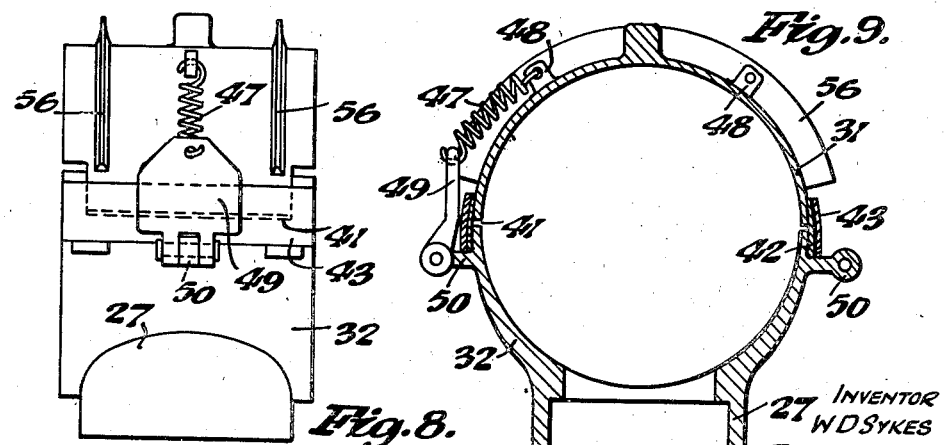

Patented May 16, 1939

2,158,386

UNITED STATES PATENT OFFICE 2,158,386

ROTARY VALVE FOR INTERNAL COMBUSTION ENGINES

Walter David Sykes, Sully, Penarth, South Wales

Application May 9, 1938, Serial No. 206,829
In Great Britain May 28, 1937

12 Claims. (Cl. 123—190)

My present invention relates to rotary valves for internal combustion engines. The object of my invention is to provide an arrangement and construction of rotary valve which will stand up to the adverse conditions under which it has to work. All difficulties such as providing adequate lubrication to high speed rotating parts and at the same time maintaining gas pressure in the cylinder are made more complex owing to the high temperature in which the valve is required to operate. Owing to this temperature the valve is liable to distortion causing excessive friction and loss of gases; and also so much allowance has to be made for expansion when hot that there is too much clearance when cold, so that there is loss of compression due to gas leakage when starting. Added to these difficulties is that of lubrication. Owing to high speed of rotation, usually half engine speed, the valve must be well lubricated, yet, owing to the necessity of the above mentioned slackness in the bearings, there is the problem of how to maintain clearance and yet prevent oil pouring into the cylinder, or being blown out through the exhaust pipe.

The only solution is to cool the valve externally and internally, and beyond this, so to equalise temperatures at the vital sealing contact surfaces that the expansion of the sealing means will be the same as that of the valve, so that excessive clearance will not be necessary.

In designing the present invention the following points have been kept in view:—

Since the outside surface of the valve must be in gas-tight contact with the sleeve, as described later in this specification, fitting round it and forming the connection between the valve and the cylinder port it is essential that this surface, as well as the inner surface of the valve, must be kept cool. To do this it is necessary not only to pass cooling liquid through the valve in large quantities, but the sleeve itself should not be bulky but as thin as possible consistent with strength, and it should also be surrounded with cooling liquid in constant flow.

Since the valve must be kept cool it does not seem right, as has been elsewhere proposed, to attempt to cool it with a water jacket through which water rising from the cylinder block is circulated, since the temperature of this water must be in the neighbourhood of some 200°. It is therefore proposed that the valve should be cooled by a circulating system not connected to the cylinder water jacket.

Since the valve must rotate it has been so designed that it will have the pumping effect of a centrifugal pump, so that circulation of a large volume of liquid is obtained without auxiliary pumps forcing oil through restricted channels at high pressure as has hitherto been proposed.

It is important that the liquid which circulates within the valve should enter at some points on the periphery of the valve, and, more important still, that it should be expelled also through apertures in the periphery. If cooling liquid enters and leaves at points radially inwards of the periphery, say for instance through hollow axial pipes of less diameter than the valve, then the cooling system will fail, owing to the fact that centrifugal force exerted on the liquid, due to the high speed of rotation of the valve, will cause the layer of the liquid in contact with the inner surface of the valve to remain steadily pressed up against that surface. This layer of oil will become as hot as the valve and will remain immovably wedged up against it. The cool liquid introduced into the valve in the neighbourhood of its axis will move through it as a solid stream, passing from one end to the axial exit at the other; while the hot liquid will remain trapped up against the surface which it has been hoped to cool.

For the above reason in the present design the coolant enters the valve through slots in its periphery at one end of the valve, and is expelled by the action of radial impeller blades through peripherical slots at the other end of the valve; by this means hot liquid cannot remain trapped in any part of the interior of the valve.

It is proposed to use oil as coolant. Since this is also a lubricant there is no need to separate the cooling medium which surrounds the valve from that which is within the valve, so that a valve housing is not necessary. This means that the coolant is in immediate contact with the gas seal or sleeve instead of being removed from it by the thickness of the metal forming the valve housing and water jacket as previously proposed.

In connection with rotary valves the term valve housing has come to mean not only the wall of metal which encloses the valve, and forms at the same time the wall of the water jacket, if water cooled, but further this housing also acts as the bearing for the valve, and as such it must be of reasonably thick section to perform this duty against the force of the expanding gas in the cylinder. Owing to its thickness it does not readily transfer the heat from the valve within it to the water surrounding it, the valve therefore runs at a higher temperature than would be the case were the housing absent. Further, the housing which actually is the valve bearing must also be the gas tight seal. This combination of bearing and gas-tight seal produces difficulties, such as over-lubrication, and ineffective gas tightness throughout the range of varying temperatures.

In the present design there is no valve housing, the bearing surfaces are separated from and have nothing in common with, the gas sealing sleeve, which latter can be made of light and graduated section as described later in this specification.

The exhaust gases must be removed by the shortest path. An exhaust pipe within the valve having a diametrical direction may have the shortest path, but it has the disadvantage that a longitudinal expansion due to heat has a wedge-like effect upon the two opposed walls of the valve causing it to assume a slightly elliptical shape, thereby affecting gas tightness. An exhaust pipe having an axial direction has not this disadvantage, and it should be as short as possible in order that it may offer the least heated area to be cooled by the liquid surrounding it. Further, it must not itself perform the duty of a journal in a bearing, owing to its very high temperature.

In order that the invention may be clearly understood it is described below with reference to the accompanying drawings, wherein:—

Fig. 2 is a cross section on the line 2—2 of Fig. 1.

Figure 1:
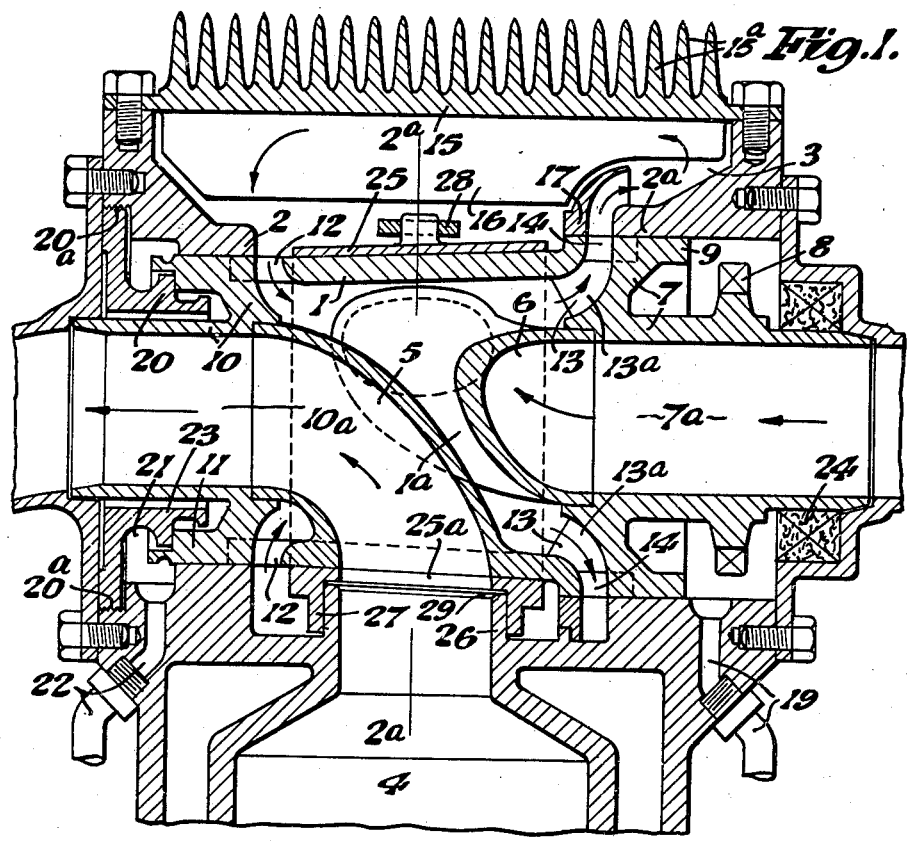
Fig. 1 is a longitudinal section through a valve, valve chamber and top portion of cylinder.
Figure 3:
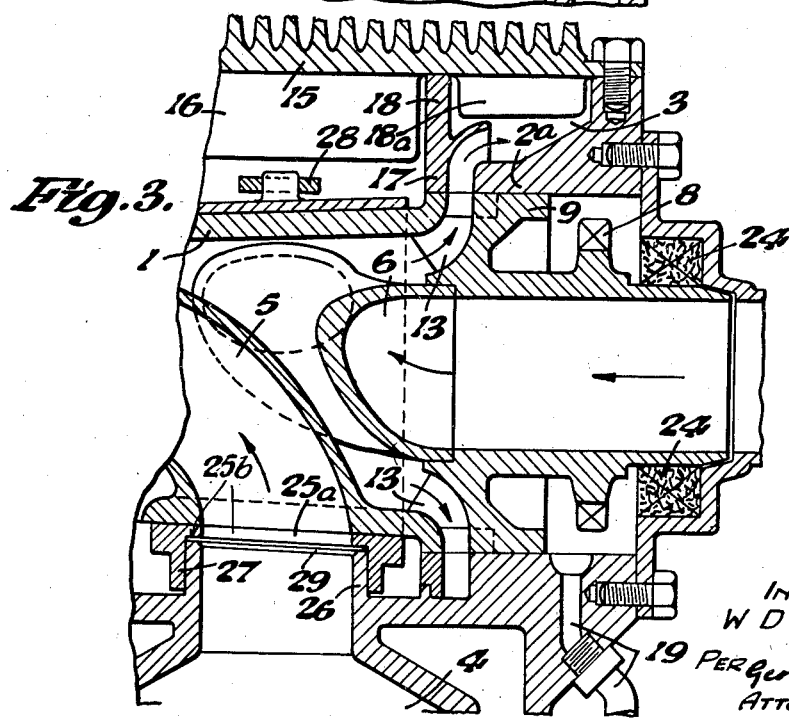
Fig. 3 is a detail sectional elevation of a slight modification.

Figs. 4 and 5 are side elevation and cross section respectively of one arrangement of split sleeve receiving the valve, and Figs. 6 and 7 and also Figs. 8 and 9 likewise show two other modifications of split sleeve.

In these drawings the reference numeral 1 indicates a hollow rotary valve, having bearings 2, 2ª in opposite sides of the valve chamber 3 which, in the drawings, is shown as an integral casting with the cylinder 4, but which may be a separate casting bolted to the cylinder block in any convenient manner. The valve chamber 3 serves to enclose the valve and forms an oil container, and may be circular or rectangular in cross section. Rectangular form is shown in Fig. 2.

Internally the valve 1 contains an exhaust pipe 5 and an inlet pipe 6. These pipes springing from the exhaust port 5ª and inlet port 6ª in the peripherical wall of the hollow valve, curved into the centre thereof, and then take up a direction co-axial with the valve body. They are of lesser diameter than the valve body so that there is an annular space between them and the peripherical wall of the valve. This annular space surrounding the inlet and exhaust passages contains oil acting as a cooling medium, and this coolant is in continuous flow, as described below.

The valve is closed at one end by an end plate 7 which acts as an axial continuation of the inlet pipe 6 and carries the driving pinion 8 which is driven from the engine crank shaft by chain or other convenient means, not shown. This end plate 7 is flared out to meet the outer periphery of the valve and is there continued to form the journal 9 working in the previously mentioned bearing 2ª formed in the valve chamber.

The opposite end of the valve is closed by an end plate 10 which forms a continuation of the exhaust pipe 5. This end plate is also flared out to meet the outer periphery of the valve and is there continued to form the journal 11 working in the bearing 2. At this end of the valve there are slots 12 cut in its periphery through which oil contained in the valve chamber 3 may enter and fill its interior.

Returning to the other side. Carried by the end plate 7, or otherwise secured between the end plate and the interior wall of the valve, are impeller blades 13, which, when the valve rotates, cause the oil contained therein, and which has taken up heat from the hot exhaust pipe 5 and other hot spots in the valve, to be expelled through slots 14, cut in the periphery of the valve opposite the blades, into the valve chamber 3. Thus a continuous circulation is set up, and the coolant flows freely through the valve through large obstructionless passages. It should be mentioned that violent circulation is not desired, and the number of blades and their curvature will be such as to give a smooth steady flow.

The valve chamber 3 is closed at the top by a cover plate 15 which is finned to assist cooling. The inner side of the plate is also finned as may be seen in Figs. 1 and 2, and these inner fins 16 depend into the oil in the chamber and transfer the heat from the oil to the outer fins. It will be noticed in Fig. 2 that sides of the valve chamber are also finned, and internal fins may be added if necessary. By this means a very large cooling area is exposed to the surrounding air, so that the hot oil issuing from the interior of the valve is cooled in the valve chamber before it enters again into the valve through the slots 12. Adjacent to the impeller slots 14 an annular baffle plate 17 with a shaped outer periphery is shown, this is to cause the hot oil to take the longest path and flow through the depending fins 16 in the chamber before returning into the valve.

It will be noticed that no attempt is made, by the use of glands or other means, to prevent oil in the valve chamber from leaking out between the valve and bearings 2, 2ª. In fact a slight seepage of oil is welcomed as this will ensure adequate lubrication, and will keep the bearing cool.

Oil seepage from the inlet side of the valve will return to the engine sump, or a separate sump, by way of pipe 19. On the exhaust side the bearing is cooled by the cool oil passing along the inner face of the end plate 10. This end plate bears against a thrust block 20 which is deeply grooved at 21. Oil leaking out through the bearing 2 flows round this groove, and dripping into the pipe 22, returns to the sump.

The thrust block is extended in a cylindrical form 23 inwards, along and surrounding the exhaust pipe, but does not touch it. This cylindrical portion performs the double function of shielding that part of the end plate 10 which acts as the journal from the heat radiated from the exhaust pipe, and as a means for preventing oil seeping out of the bearing falling on the exhaust pipe and being burnt up there. The valve chamber is kept full of oil by the engine pump or an auxiliary pump. A gland is indicated on the inlet pipe 6 at 24. This is to prevent the induction from the carburettor from being interfered with by air leakage.

In order to seal adequately the non-ported area of the valve in relation to the cylinder and render the connection gas-tight, a floating sealing ring or sleeve 25 is disposed about the valve. The cylinder head port is formed as a short cylindrical outwardly projecting boss 26 which projects into a port 25ª in the floating sealing ring, this port 25ª also being formed as a short cylindrical boss 27 projecting from the sleeve and fitting closely round the boss 27. Packing may be introduced between these two pipes to ensure gas-tightness, but it is preferred that the fit shall be such a true strong press-fit that it will be perfectly gas-tight.

The sleeve will be held from rotation by this pipe connection, but a further strut 28 may be provided at the top as additional steadying means.

The inner lip of the cylinder port pipe 26 is shown bevelled as at 29, or sufficient clearance will be maintained between the top of the pipe 26 and the sleeve, so that gas pressure at the point shown by the arrows 30 in Fig. 2, will cause the sleeve to be in intimate contact with the valve within it. It should be remarked that the sleeve is not held by the strut 28 from minute movement away from the cylinder, because its vertically upward movement, due to the force of expanding gas in the cylinder, is prevented only by its being forced into close contact with the valve and thus ensuring gas-tightness.

The sleeve will be made of resilient metal sprung to fit the valve or capable of being spring urged in order to maintain close contact with the valve and to take up any wear that may take place, and to enable this to be done it will be split longitudinally at the top, or, as shown in Figs. 4 to 9, it may be made in two longitudinal halves and spring urged together.

Referring to Fig. 2 it will be seen that the sleeve 25 has a graduated section, being very thin for the greater part. Being very thin it will not retain heat, but will quickly transfer the heat from the valve within it to the cool oil flowing round it.

It will be apparent that the sleeve and valve may be cylindrical as shown in Figs. 4 to 9 or conical as shown in Fig. 1, but in the case of a conical sleeve and valve, the sleeve need not be split or spring urged to fit the valve, since the fineness of clearance can be adjusted by a very small lateral movement of the valve in relation to the sleeve. The correct position of the valve in relation to the sleeve will be fixed by the thrust block 28, which may be threaded and screwed into the wall of the valve chamber as at 20ª, so that adjustment may at any time be possible by a slight turn of the thrust block.

Unless special provision is made centrifugal pumps have a reaction towards the entry end of the pump. This being so the valve will have a tendency to move laterally towards, and maintain thrust against, the thrust block. However, the force of the thrust depends on the efficiency of the pump, and in the present case a powerful pump is particularly not desired, since a gentle liquid circulation only is required.

As hereinbefore mentioned the sleeve 25 can be split, and in practice it is desirable to ensure that there is adequate response on the part of the sleeve to expansion and contraction due to the drastic changes in temperature whilst ensuring always a good sealing engagement with the rotary valve. To achieve this desideratum arrangements of split sleeves such as shown in Figs. 4 to 9 inclusive can be adopted. In these arrangements the sleeve comprises an upper substantially half cylindrical part 31 and a lower substantially half cylindrical lower part 32.

The upper portion 31 has a rectangular tongue 33 (formed by stepping in the edges of the sleeve section as at 33ª) of less width than the sleeve itself, but of greater width than the diameter of the port formed in the valve which rotates within the sleeve. The valve is not shown but for the sake of clarity the proportionate size of a port is indicated by broken line circles 34 in Fig. 1.

The lower half 32 is substantially correspondingly recessed, leaving extended shoulders 35 on each side, so that the tongue of the upper half fits into the recess formed between the two shoulders 35. The tongue 33 and recess 35 are common to all of the modifications shown in Figs. 4 to 9.

The two halves 31 and 32 are spring urged together so that the sleeve can be regarded as expanding against the influence of spring means. For this purpose in the arrangement shown in Figs. 4 and 5 a lateral projection 36 is formed on each shoulder 35 of the lower half 32 to act as brackets for a pair of bridge pieces 37. On the upper half 31 a pair of lateral centre brackets 38 are formed, and a coiled compression spring 39 is fitted between each bracket 38 and the opposed bridge piece 37. This arrangement has the effect of urging the two halves of the sleeve towards each other, and thus maintaining a close fit on the valve 1, within it, irrespective of the change of valve diameter due to varying temperatures. Alternatively, both the bridge pieces and coil springs may be dispensed with and replaced by a leaf spring whose centre rests against the bracket 38 on the upper half, and the two ends react against the projections 36 formed on the shoulders 35 of the lower half, as indicated by the broken line 40.

It will be seen that the clearance space 41, where the two halves of the sleeve approach each other, will increase as the valve within it (not shown) expands as its temperature rises, so that the oil surrounding the sleeve will enter the ports in the valve as they pass these spaces 41. To prevent this a pair of sealing strips 42 formed of some resilient material and held in place by a cover strip 43 are fitted by screws 43ª or other suitable fastening members across the two spaces.

Instead of coiled compression or leaf springs coiled springs 44 under tension may be used as shown in Figs. 6 and 7, the ends of the springs 44 being attached to brackets 45 formed on the lower half. These springs may be taken completely round the sleeve forming a garter, or instead of coiled springs plain rings something like piston rings may be adopted, such springs being tempered to spring inwards, and these springs may be slipped on to the sleeve as indicated by the broken line 46.

In a further modification as shown in Figs. 8 and 9 a pair of short coiled springs 47 can be provided, each having one end attached to one of a pair of brackets 48 on the upper half of the sleeve and the other ends connected to a pair of short levers 49 pivoted to a bracket 50 on the lower half. The levers 49 can be utilised to hold the cover strip 43 against the sleeve.

It should be realised that the spring pressure is no more than sufficient to hold the two halves of the sleeve in such close contact with the valve that oil surrounding the valve and sleeve is prevented from working its way between the sleeve and the valve in such appreciable quantities that it is swept up into the open mouth of the ports in the valve and either sucked into the cylinder or blown out with the exhaust. A film only of oil is sufficient for lubrication, since the sleeve takes no bearing thrust; and it may be necessary to form a system of interrupted grooves alternately in the valve and the sleeve to ensure that this film is in constant being.

The duty of preventing gas-leakage is performed by the lower half of the sleeve and the possibility of gas-leakage under expansion pressure is greatest between the stationary sleeve and the rotating surface of the valve within it, and whether the sleeve is made in two halves as in Figs. 4 to 9, or in one unit as in Fig. 2, the lower part of the sleeve in the neighbourhood of the port 25ᵃ must be in close contact with the valve, there being clearance only for the merest film of lubrication, the tenacity of which film acts as an effective seal. This close contact is obtained in the following manner.

It will be noticed that the port 25ᵃ in the sleeve is of less diameter than the internal diameter of the projecting pipe 27 so that there is thus formed an annular lip or shoulder 25ᵇ. Gas pressure in the cylinder, reacting against this shoulder causes the sleeve to be strongly forced up against the valve and thus actively counteracts any tendency of the other portion of the gas which is attempting to wedge its way out between the valve and the sleeve. The internal face area of this shoulder is made proportionate to the reaction required to prevent leakage.

In order to prevent vibration which may be set up in the floating sleeve due to the rapid changes of pressure during induction, compression and firing strokes, a coiled compression spring 55 may be interposed between the lower part of the sleeve and the adjacent part of the cylinder.

Since the upper part 31 of the sleeve bears no thrust pressure of any kind, but is merely there as a means for preventing the oil surrounding the valve from entering the open ports of the valve as it rotates, it may be made of light section. In such an event it may be found advisable to form on it anti-distortion ribs 56.

In the case of a multi-cylinder engine, each cylinder will have one valve, as herein described, and the valves will be driven by any orthodox engineering means, and in case of an "in-line" engine the valve chamber will extend the whole length of the cylinder block and may be common to all of the valves.

It may be advisable to mention that the end plates 10 and 7 are either cast together with the impeller blades 13, as one integral casting with the valve body, or, if made separately, they will be welded or otherwise firmly secured to the valve body, and that these parts, although described separately for the sake of clarity, form one complete valve unit.

From the foregoing it will be deduced that in this invention there is a valve and a gas-tight sealing means fully compensated for expansion and contraction at all temperatures. The manner of passing oil through the valve, through large and obstructionless passages, by the action of impeller blades and rotation of the valve, is an important feature of my invention. By this means no local hot-spots are formed to accumulate heat and cause excessive expansion and distortion; on the contrary, heat is distributed by the steady and continuous flow of the coolant in such a way that all parts of the valve and the contacting sealing sleeve are kept at relatively equal temperatures, so that the expansion of the valve at its temperature rises from cold, is compensated for by a similar expansion of the sleeve.

By the use of oil as a coolant lubrication problems are simplified and all complications such as glands, which are necessary when the valve is internally cooled by water, are obviated.

In addition to the foregoing the close contact of the sleeve with the valve, in the neighbourhood of the port in the sleeve is obtained by the action of the expanding gas in the cylinder so that gas-tightness is obtained by natural means without recourse to packings or gas pressure rings.

I claim:

1. Rotary valve for internal combustion engines comprising a hollow annular section valve body with inlet and exhaust port transfer passages therethrough substantially surrounded by the space within the said valve body and means for constantly circulating a liquid cooling medium through the valve and around and along said passages and also over the inner wall of the valve during rotation of the valve.

2. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, and inlet and outlet ports in the periphery of the valve to register successively with said stationary port.

3. Rotary valve for internal combustion engines comprising a tubular valve body, a port in the cylinder head co-operating with the valve body, a sleeve encircling the valve body, inlet and exhaust ports in the periphery of the valve body adapted to successively register with the port in the cylinder head and sleeve, axially located inlet and exhaust passages at opposite ends of the valve, curved passages connecting said inlet and exhaust ports to said axially located inlet and exhaust passages, an oil chamber enclosing the valve and sleeve, and oil ingress and egress ports in the periphery of the valve exposed to the oil in said chamber.

4. Rotary valve for internal combustion engines comprising a tubular valve, a port in the cylinder head co-operating with the valve body, a sleeve encircling the valve body, inlet and exhaust ports in the periphery of the valve body adapted to successively register with the port in the cylinder head and sleeve, axially located inlet and exhaust passages at opposite ends of the valve, curved passages connecting said inlet and exhaust ports to said axially located inlet and exhaust passages, an oil chamber enclosing the valve and sleeve, and oil ingress and egress ports formed in the periphery of the valve at parts extending beyond opposite ends of the sleeve.

5. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, bearings in the valve chamber, and journals formed on the valve body supported in said bearings.

6. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, and impeller blades with the oil egress ports to circulate the oil in the valve and valve chamber.

7. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, and cooling oil deflecting means in juxtaposition to the oil egress ports in the valve, said oil deflecting means directing the oil along the longest path in the valve chamber.

8. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, and oil deflecting means in juxtaposition to the oil egress ports in the valve, said oil deflecting means directing the oil through fins formed on the inside of the valve chamber before said oil returns to the oil inlet port in the valve.

9. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, impeller blades with the oil egress ports to circulate the oil in the valve and valve chamber, and cooling oil deflecting means in juxtaposition to the oil egress ports in the valve, said oil deflecting means directing the oil along the longest path in the valve chamber.

10. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, impeller blades to discharge the oil from the interior of the rotary valve member through said outlet ports and to circulate the oil in the valve and valve chamber, and oil deflecting means in juxtaposition to the oil egress ports in the valve, said oil deflecting means directing the oil through fins formed on the inside of the valve chamber before said oil returns to the oil inlet port in the valve.

11. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, impeller blades to discharge the oil from the interior of the rotary valve member through said egress ports in the valve and to circulate the oil in the valve and valve chamber, and a partition in the oil chamber in juxtaposition to the oil egress ports in the valve, said partition forming a separate oil compartment, and oil cooling means in said chamber.

12. Rotary valve for internal combustion engines, comprising a ported rotary valve member at the combustion chamber head, a floating sleeve surrounding said valve member, an oil chamber accommodating the valve member and sleeve, oil ingress and egress ports in the periphery of the valve member exposed to the interior of the oil chamber, and inter-engaging tubular parts in the sleeve and an adjacent end of the combustion chamber head forming a stationary port for the combustion chamber, inlet and outlet ports in the periphery of the valve to register successively with said stationary port, impeller blades to discharge the oil from the interior of the rotary valve member through said egress ports in the valve and to circulate the oil in the valve and valve chamber, a partition in the oil chamber in juxtaposition to the oil egress ports in the valve, said partition forming a separate oil compartment, oil cooling means in said oil chamber extending into said separate compartment, deflector blades in said compartment co-operating with said impeller blades to afford a centrifugal pump action, and channels for leading oil away from the valve chamber into which channels the oil is directed by said pump action.

WALTER DAVID SYKES.